(No Model.)
D. C. SHAW.
VALVE OR COCK.
No. 538,980.  Patented May 7, 1895.
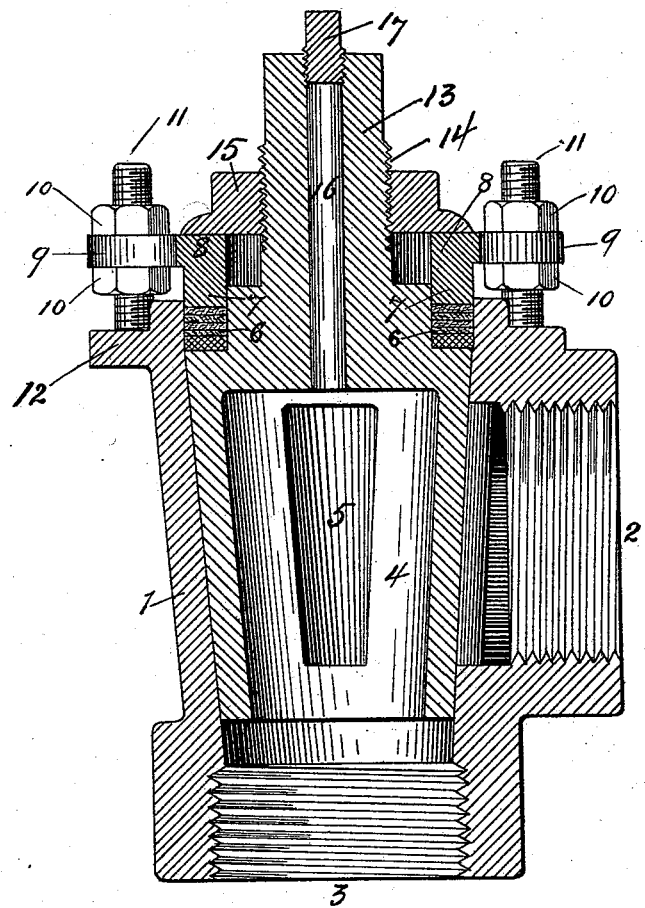
Witnesses.
David C. Walter
L. E. Brown.
Inventor.
Daniel C. Shaw
By Hiram Hall
His Attorney

UNITED STATES PATENT OFFICE.

DANIEL C. SHAW, OF TOLEDO, OHIO.

VALVE OR COCK.

SPECIFICATION forming part of Letters Patent No. 538,980, dated May 7, 1895.

Application filed August 6, 1894. Serial No. 519,538. (No model.)

*To all whom it may concern:*

Be it known that I, DANIEL C. SHAW, a citizen of the United States, residing at Toledo, Lucas county, Ohio, have invented certain new and useful Improvements in Valves or Cocks, of which the following is a specification.

My invention relates to and its object is to provide a valve or cock specially adapted for liquids or gases under high pressure, and in which corrosion and attrition of the valve and its seat by acids, sediment and the like, shall be reduced to a minimum; also to provide convenient means for loosening the valve when it adheres too closely to its seat to be readily operated; also to provide means for clearing the cock from sediment, scale or other obstruction without removing the plug or valve. I attain these objects by means of the mechanism and arrangement of parts hereinafter described, and shown and illustrated in the accompanying drawings, made part hereof, in which the single figure represents a central, vertical, sectional view of my valve or cock.

In the drawing, 1 is the valve-casing, 2, the inlet thereto, and 3 the outlet therefrom, or reversely, as the case may be. These openings are suitably screw-threaded to admit of connections with the line of pipes in which the cock is to be placed.

4 is the valve or plug which with its seat is formed, preferably, somewhat tapering as shown. The valve or plug 4 is hollow and has two ports, viz: its open inner end and an aperture 5 in its side which may be turned to coincide with and to form a passage through opening 2 in the valve-casing.

Surrounding the valve-stem is a stuffing-box 6, provided with suitable packing held and compressed by gland 7, on gland-plate 8, which is provided with lugs 9, engaged and held in adjustment by nuts 10, on a series of bolts 11, rigidly secured to lugs 12 on the valve-casing. The outer extremity of valve-stem 13 is screw-threaded, as at 14, and is provided with a nut, 15, which may be set up against the outer surface of gland-plate 8.

It frequently happens that cocks when not open become clogged and obstructed with mud, sediment or scale, as in blow-off cocks for boilers. When this occurs the mere turning of the plug does not open up the way through the cock and it becomes necessary with the cocks heretofore in use, to remove the plug before the stream can be started. To obviate the difficulty here pointed out, valve-stem, 13, is bored axially, as at 16, from its outer end into chamber 4, the bore being closed at its outer end by a square-headed, screw-threaded tap 17, or equivalent device, which may be readily removed or opened. A stiff wire or small rod, inserted through bore 16, may be used to stir and loosen the obstructing substance in the cock and the connections leading to it, thus starting the stream which will soon clear its way.

The operation of my device is obvious without further explanation.

The advantages presented are, first, that the pressure of the gland-plate 8, longitudinally, upon the conical plug 4 insures close contact between the plug and its tapering seat, preventing the passage or leakage of liquids or gases under high pressure. This close contact of the plug and plug-seat, however, frequently causes the plug to stick fast in its seat. When this occurs a turn upon nut 15, which takes the threaded valve-stem 13, will lift the plug slightly from its seat, permitting the easy turning of the cock; second, the open bottom of the hollow plug prevents the accumulation of sediment within the cock, while the single side aperture 5, which should move only through a small arc, exposes but a small part of the face of the valve-seat, thus minimizing the action of grit and acids upon the surfaces of the plug and plug-seat; and third, when the valve becomes clogged or obstructed the stream may be started by inserting a wire through the small axial bore of the valve-stem without disturbing any other part of the device.

What I claim as my invention, and desire to secure by Letters Patent, is—

1. In combination with the casing and the plug and plug-seat therein, the stuffing-box, the gland-plate, the screw-threaded-valve-stem and the nut thereon, adapted to be screwed against said gland-plate, substantially as shown and described, for the purpose specified.

2. In a cock or valve, a casing in combination with a conical plug seated therein and a valve-stem on said plug having an axial bore provided with suitable means for opening and closing said bore, and having its outer extremity screw-threaded and provided with a nut thereon, substantially as and for the purpose specified.

3. A cock or valve comprising in its construction a casing, a conical hollow plug seated therein, said plug having an open end and a single side aperture, a stuffing-box, a screw-threaded valve-stem and a nut thereon, all substantially as shown and described, for the purpose specified.

DANIEL C. SHAW.

Witnesses:
LUKE A. EMERSON,
L. E. BROWN.